J. MIHALYI.
OPTICAL INSTRUMENT.
APPLICATION FILED AUG. 22, 1916.

1,229,117.

Patented June 5, 1917.

Inventor:
Joseph Mihalyi
by Davis & Simms
his attorneys

UNITED STATES PATENT OFFICE.

JOSEPH MIHALYI, OF ROCHESTER, NEW YORK, ASSIGNOR TO CROWN OPTICAL COMPANY, OF ROCHESTER, NEW YORK, A CORPORATION OF NEW YORK.

OPTICAL INSTRUMENT.

1,229,117.      Specification of Letters Patent.      Patented June 5, 1917.

Application filed August 22, 1916. Serial No. 116,251.

*To all whom it may concern:*

Be it known that I, JOSEPH MIHALYI, a subject of the Emperor of Austria-Hungary, and resident of Rochester, in the county of Monroe and State of New York, have invented certain new and useful Improvements in Optical Instruments, of which the following is a specification.

The present invention relates to optical instruments and an object of the same is to provide a simple and inexpensive mounting for the diopter ring permitting it to be accurately and quickly adjusted to its operative position on the part by which it is carried. Another object of the invention is to provide for limiting the outward movement of the axially and rotatably mounted tube or sleeve which carries the eye piece, in such a manner that a continuous spiral guide may be formed upon both the stationary sleeve and the tube which carries the eye piece while, at the same time, the labor of adjusting such stops will be eliminated.

To these and other ends, the invention consists in certain parts and combinations of parts all of which will be hereinafter described, the novel features being pointed out in the appended claims.

Figure 1:
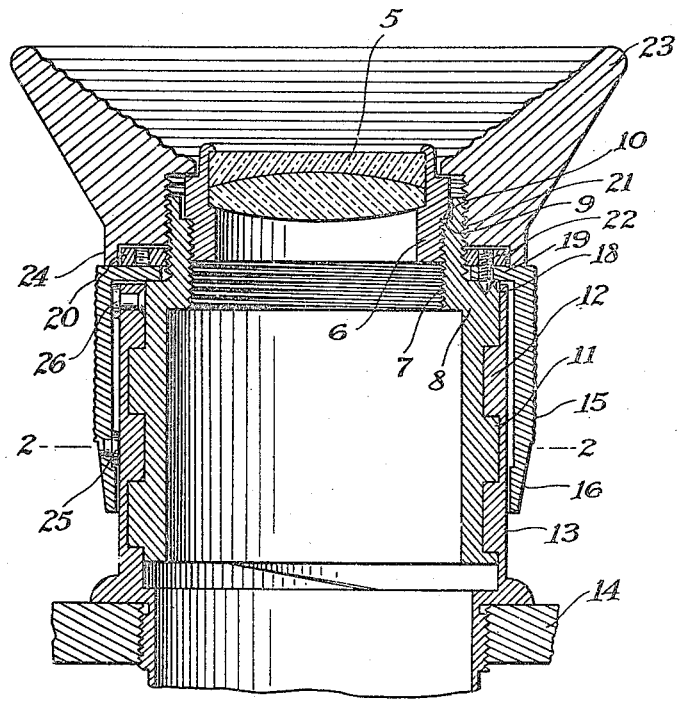
Figure 1 is an axial section through the ocular and the adjacent parts of an optical instrument.
Figure 3:
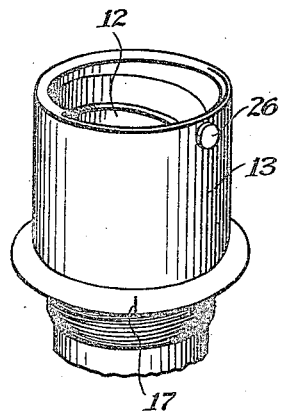
Fig. 3 is a perspective view of the stationary sleeve.
Figure 2:
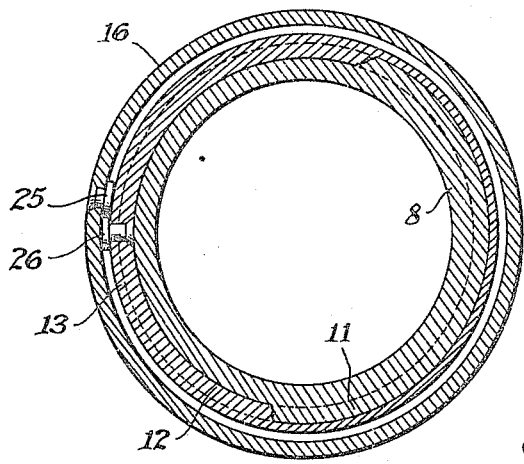
Fig. 2 is a section on the line 2—2, Fig. 1.
Figure 4:
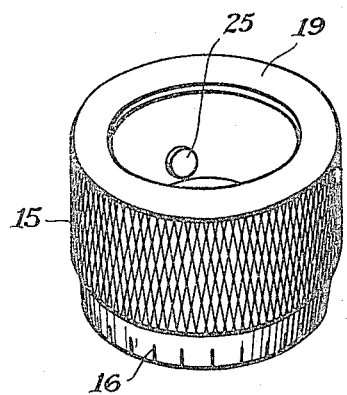
Fig. 4 is a perspective view of a diopter ring.

Referring more particularly to the drawings, 5 indicates the eye piece or coular arranged upon a mounting 6 which is externally threaded near one end to engage internal threads 7 on a sleeve 8, the sleeve 8 having also an internal shoulder 9 for engagement by an external shoulder 10 on the mounting 6. The sleeve or tube 8 is mounted to rotate and move axially and, to this end, is formed with a spiral rib 11 on its exterior adapted to be engaged between its convolutions by a spiral rib 12 on the interior of a stationary sleeve 13 which, in this instance, is anchored in a casing 14 of any suitable optical instrument.

The diopter ring 15, which carries indications 16 for coöperation with an index 17 on the stationary sleeve 13, is adjustably mounted on the rotary and axially movable sleeve 8 and to this end the sleeve or tube 8 may be provided beyond the sleeve 13 with an external shoulder 18 for engagement by an inwardly projecting flange 19 on the diopter ring 15 so that the latter may surround the tube or sleeve 13. This flange 19 is engaged by a clamping ring 20 which is internally threaded to engage the external threads 21 on the tube 8. The diopter ring is turned until its zero point coincides with the index 17 on the stationary casing 13, after which the clamping ring 20 is turned to hold the diopter ring in its adjusted position. A screw 22 is then passed through the clamping ring 20, and the flange 19 and into the sleeve or tube 8 so as to hold the diopter ring and clamping ring in their adjusted positions. An eye cap 23 also engages the threads 21 of the sleeve or tube 8 and has a depending flange 24 surrounding the clamping ring 20 to inclose the latter.

In order to limit the outward movement of the eye piece and the axially movable tube or sleeve 8, two stops 25 and 26 are provided respectively upon the diopter ring and the stationary sleeve 13, these stops being preferably in the form of projections, one on the inner wall of the diopter ring and the other on the outer wall of the stationary sleeve 13. The positions of the stops are such that the diopter ring may be rotated freely in either direction to adjust the eye piece to the proper focus of the eye of the user without any coöperation between these two stops, but when the eye piece is turned to a certain point, the stops will engage and prevent the further turning of the tube 8 in the direction of withdrawal from the sleeve 13. The arrangement of the stops on the diopter ring and the sleeve 13 in the manner claimed permits the two tubes to have their guiding faces continuous on both parts without the liability of being separated or disconnected, and the trouble and time heretofore consumed in adjusting the stopping means is eliminated.

This application contains matter divided from an application filed by me on the 19th day of April, 1916, Serial No. 92,287.

What I claim as my invention and desire to secure by Letters Patent is:

1. In an optical instrument, a stationary sleeve, a tube rotatably and axially adjustable therein, an eyepiece mounting carried by said tube, a diopter ring adjustable on said tube, a clamping ring for holding the diopter ring in its adjusted position, and an eyecap piece secured to said tube and covering the clamping ring.

2. In an optical instrument, a stationary sleeve, a tube rotatably and axially movable therein and having an externally threaded portion, and a shoulder at the base of the externally threaded portion, a diopter ring having an interior flange rotatable on the shoulder of the tube, a clamping ring engaging said exteriorly threaded portion and said flange on the diopter ring, an eyecap engaging said exteriorly threaded portion, and an eyepiece carried by the rotatable and axially movable tube.

3. In an optical instrument, a stationary sleeve, a tube rotatably and axially adjustable therein, an eyepiece carried by said tube, a diopter ring adjustable on said tube, a stop on said diopter ring, and a stop on the stationary sleeve for coöperation with the stop on the diopter ring to limit the outward movement of the rotatably and axially movable tube.

JOSEPH MIHALYI.

Copies of this patent may be obtained for five cents each, by addressing the "Commissioner of Patents, Washington, D. C."